US008872397B2

(12) United States Patent
Nonaka

(10) Patent No.: US 8,872,397 B2
(45) Date of Patent: Oct. 28, 2014

(54) ROTARY ELECTRIC MACHINE

(75) Inventor: Tuyoshi Nonaka, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 348 days.

(21) Appl. No.: 13/289,041

(22) Filed: Nov. 4, 2011

(65) Prior Publication Data

US 2012/0146434 A1 Jun. 14, 2012

(30) Foreign Application Priority Data

Dec. 9, 2010 (JP) ................................. 2010-275061

(51) Int. Cl.
 *H02K 1/04* (2006.01)
 *H02K 3/52* (2006.01)
 *H02K 1/14* (2006.01)
 *H02K 21/16* (2006.01)
 *H02K 15/12* (2006.01)

(52) U.S. Cl.
 CPC ............ *H02K 3/522* (2013.01); *H02K 2203/12* (2013.01); *H02K 1/148* (2013.01); *H02K 21/16* (2013.01); *H02K 15/12* (2013.01)
 USPC ................................ 310/43; 310/194; 29/605

(58) Field of Classification Search
 CPC ........... H02K 5/08; H02K 15/14; H02K 5/00; H02K 5/02
 USPC ............... 310/43, 194, 208; 29/596, 598, 605
 See application file for complete search history.

(56) References Cited

U.S. PATENT DOCUMENTS

| | | | | |
|---|---|---|---|---|
| 6,040,647 A | * | 3/2000 | Brown et al. | 310/89 |
| 2003/0098630 A1 | * | 5/2003 | Owada et al. | 310/259 |
| 2003/0160532 A1 | * | 8/2003 | Suzuki et al. | 310/218 |
| 2007/0114878 A1 | * | 5/2007 | Tatebe | 310/259 |
| 2009/0322180 A1 | | 12/2009 | Nonaka | |
| 2010/0026133 A1 | * | 2/2010 | Fubuki et al. | 310/208 |

FOREIGN PATENT DOCUMENTS

| | | |
|---|---|---|
| CN | 101669267 | 3/2010 |
| JP | 2003-304656 | 10/2003 |
| JP | 2011-103733 | 5/2011 |
| WO | WO 2008/149649 | 12/2008 |

OTHER PUBLICATIONS

Chinese Office Action for corresponding CN Application No. 201110401795.3, Dec. 4, 2013.
Chinese Office Action for corresponding CN Application No. 201110401795.3, Jun. 11, 2014.

* cited by examiner

*Primary Examiner* — Thanh Lam
(74) *Attorney, Agent, or Firm* — Mori & Ward, LLP

(57) ABSTRACT

A rotary electric machine according to an embodiment includes a substantially cylindrical rotator that is freely rotatably supported, a stator, and a bracket that supports the rotator and the stator. The stator includes stator coils in which a plurality of air-cored coils are arranged in a ring shape and are integrated by resin, each of the air-cored coils being formed by winding a round copper wire and having an outer shape subjected to pressure molding, and stator cores divided for each of teeth.

15 Claims, 17 Drawing Sheets

ROTARY ELECTRIC MACHINE

CROSS-REFERENCE TO RELATED APPLICATIONS

The present application claims priority under 35 U.S.C. §119 to Japanese Patent Application No. 2010-275061 filed on Dec. 9, 2010. The contents of this application are incorporated herein by reference in their entirety.

BACKGROUND OF THE INVENTION

1. Field of the Invention

A disclosed embodiment relates to a rotary electric machine such as an AC servo motor.

2. Discussion of the Background

In a general rotary electric machine such as a motor and a generator, a temperature of stator coils rises by a load current for drive. Rated output of the rotary electric machine is limited by an allowable temperature of the stator coils, and accordingly, cooling performance for the stator coils has become a factor for determining a magnitude of the rated output.

As an example of such a rotary electric machine in which the cooling performance for the stator coils is enhanced, a rotary electric machine described in WO/2008/149649 A1 is mentioned. In the rotary electric machine described in this document, heat generated in the stator coils is directly radiated to a bracket from coil ends of the stator coils, and the cooling performance for the stator coils is enhanced.

SUMMARY OF THE INVENTION

In an aspect of an embodiment, a rotary electric machine includes a substantially cylindrical rotator that is freely rotatably supported, a stator, and a bracket that supports the rotator and the stator. The stator includes stator coils in which a plurality of air-cored coils are arranged in a ring shape and are integrated by resin, each of the air-cored coils being formed by winding a round copper wire and having an outer shape subjected to pressure molding, and stator cores divided for each of teeth.

In accordance with the aspect of the embodiment, a stator coil is not molded by molding resin on a main line of a manufacturing process, but the stator coils integrally molded in advance in a sub-line are prepared as one component. Accordingly, in the main line, the rotary electric machine is completed only by assembly, and the process time can be reduced to a large extent. Moreover, the rotary electric machine that has been discarded and unnecessary can be easily disassembled only by detaching fastening bolts, and in particular, it is easy to separate iron members and copper members from each other, and ease of recycling can be remarkably enhanced.

DESCRIPTION OF THE EMBODIMENTS

Figure 1:
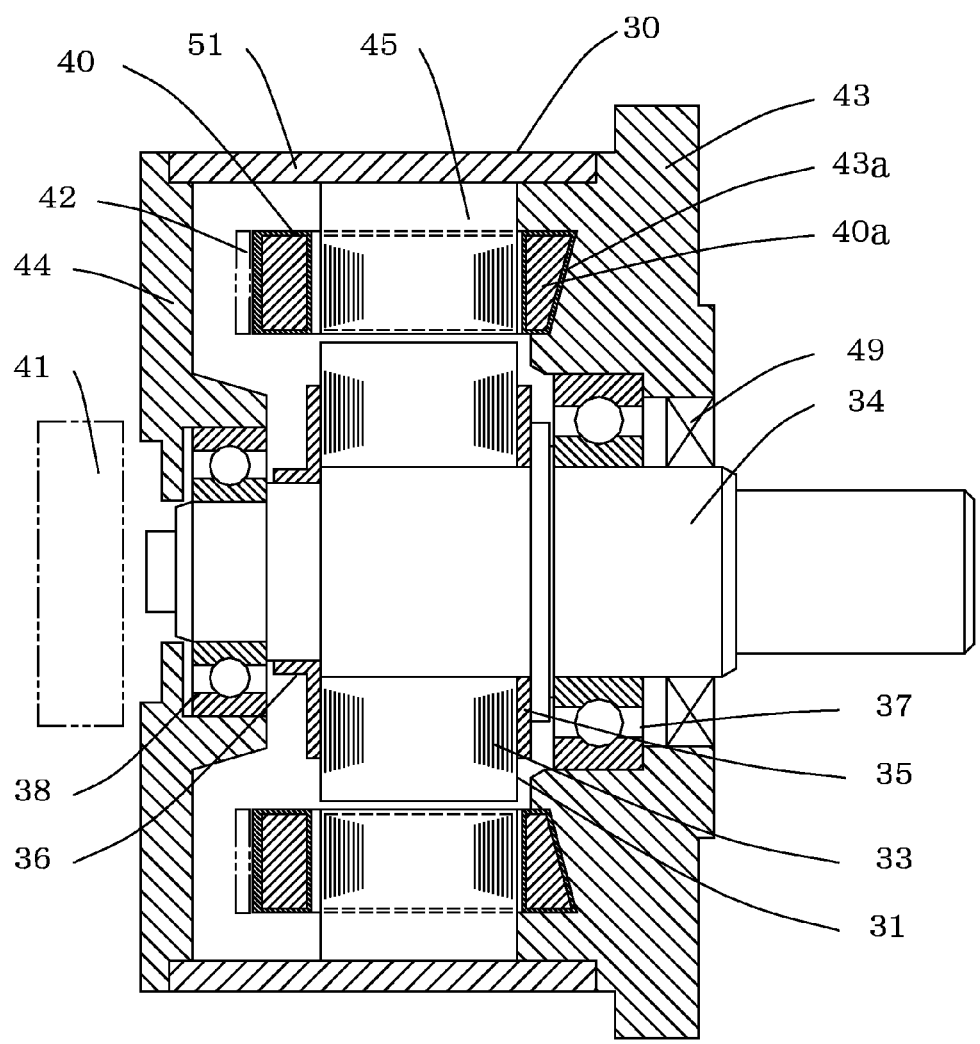
FIG. 1 is an axial cross-sectional view of a rotary electric machine according to a first embodiment.

A description will be made below of embodiments of a rotary electric machine, which is disclosed by this application, with reference to the drawings. Note that the same reference numerals are denoted to the same components, whereby a repeated description is omitted as appropriate.

<First Embodiment>

First, a description will be made of a configuration of a rotary electric machine according to a first embodiment with reference to FIG. 1. FIG. 1 is an axial cross-sectional view of a rotary electric machine according to the first embodiment.

As shown in FIG. 1, the rotary electric machine according to this embodiment includes a substantially cylindrical rotator 31 that is freely rotatably supported, a stator 30, and a load-side bracket 43 and an anti-load-side bracket 44, which support these components.

A rotator core 33 of the rotator 31 is fixed to a shaft 34 by a load-side side plate 35 and an anti-load-side side plate 36, and is freely rotatably supported by the load-side bracket 43 and the anti-load-side bracket 44 while interposing a load-side bearing 37 and an anti-load side bearing 38 therebetween. On an anti-load-side end of the shaft, an encoder unit 41 for detecting a rotation position of the rotator is installed.

A load-side coil end 40a of each of stator coils is installed in close contact with each of recessed portions 43a of the load-side bracket in an embedded manner. Therefore, heat conduction from the load-side coil end 40a of each stator coil to the load-side bracket 43 can be made favorable, and a larger load current is enabled with respect to an allowable temperature of the stator coils, and rated output of the rotary electric machine is enhanced.

Power to the stator coils 40 is supplied from an outside, and from a connection unit 42 for the stator coils through lead wires (not shown).

By bolts (not shown), the anti-load-side bracket is fastened to the load-side bracket 43 together with a frame 51. In order to prevent entrance of a foreign object into an inside of the rotator, a dust seal 49 is provided on an outside of the load-side bracket bearing.

Figure 2:
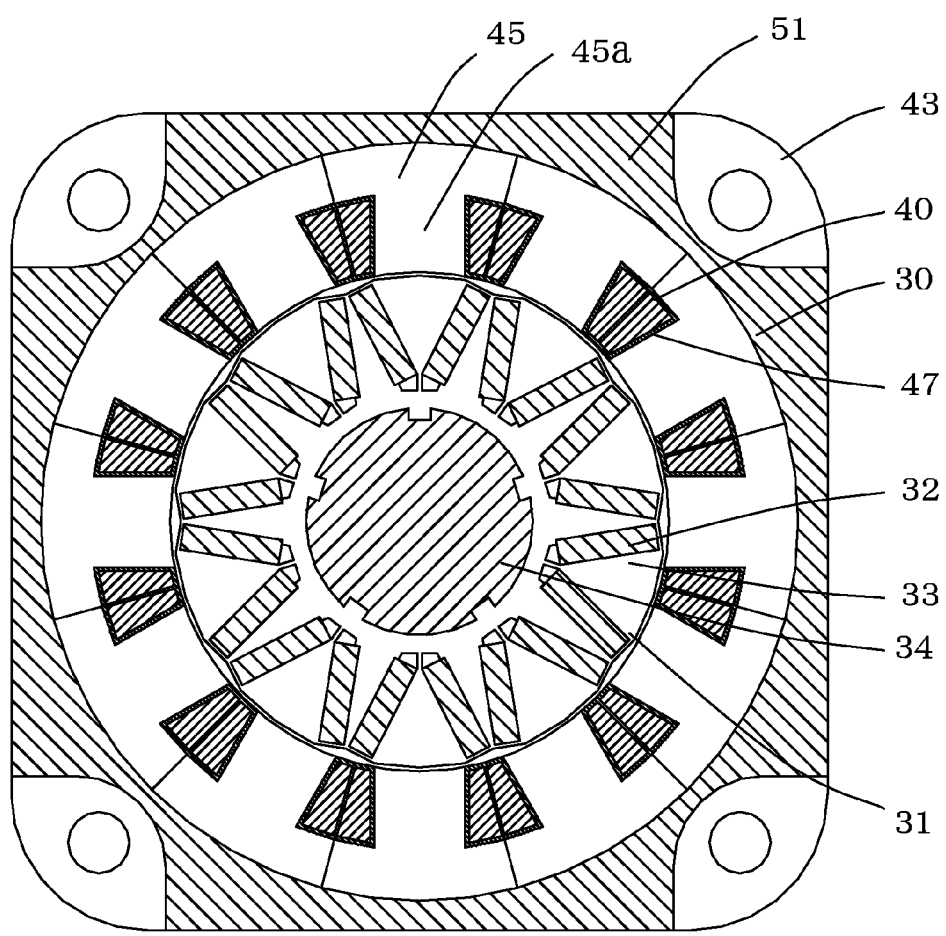
FIG. 2 is a radial cross-sectional view of the rotary electric machine according to the first embodiment.

FIG. 2 is a radial cross-sectional view of the rotary electric machine according to the first embodiment.

As shown in FIG. 2, the rotator 31 of the rotary electric machine has an embedded magnet structure, in which permanent magnets 32 are installed in a V-shape per pole on the rotor core 33, and ten magnetic poles are configured.

The stator includes stator cores 45 divided into twelve pieces for each of teeth, and the stator coils 40 molded integrally therewith by molding resin 47.

A width of each of teeth portions 45a of the divided stator cores is constant with respect to a radial direction, and the teeth portions 45a have a so-called open slot structure. Accordingly, each of the stator coils can largely ensure an occupation area up to the same inner circumference as that of each of the stator cores, and by this amount, uses a thick round copper wire to reduce resistance, and obtains an effect of reducing heat generation.

Figure 3:
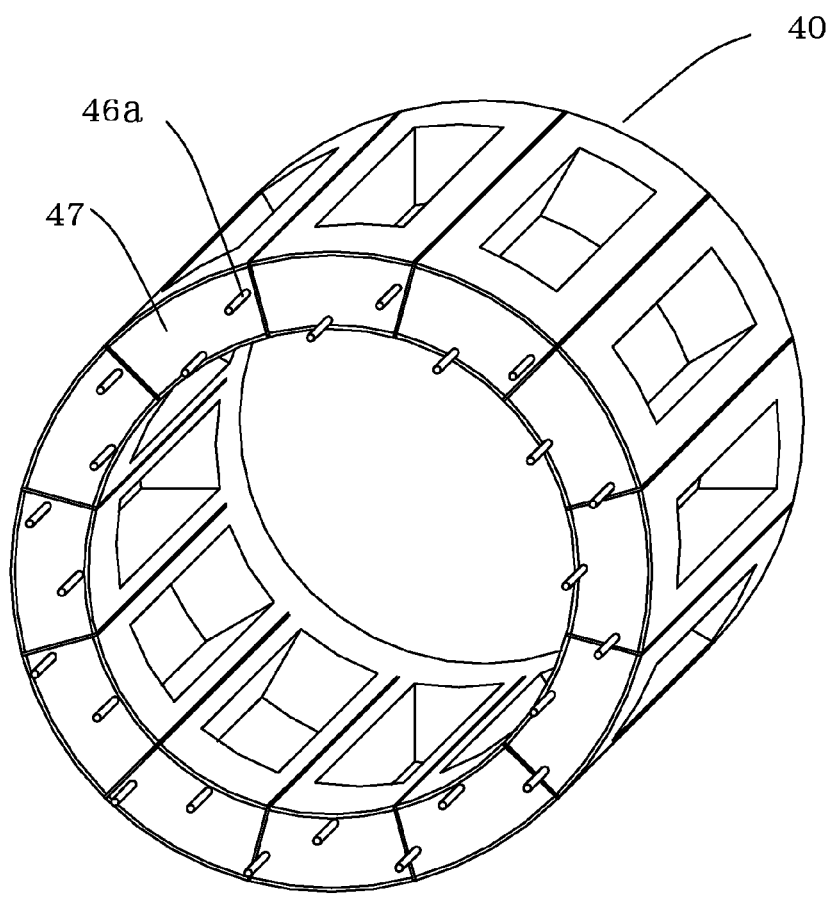
FIG. 3 is an outer appearance view of stator coils.

FIG. 3 is an outer appearance view of the stator coils.

In FIG. 3, the stator coils 40 are components, in which twelve air-cored coils wound into concentrated windings and having an outer shape subjected to pressure molding are integrally molded by the molding resin 47. With regard to the stator coils 40, outsides thereof excluding coil ends having conductor ends 46a of the air-cored coils provided thereon are coated with an insulating material contained in the integrated air-cored coils or by insulating performance of the molding resin 47 itself, and the air-cored coils are not in contact with surfaces of the stator coils 40. Accordingly, insulating properties of the stator coils 40 from the brackets are ensured even if the stator coils 40 are directly brought into close contact with the brackets. Moreover, the insulating material, which is contained in the integrated air-cored coils, or the resin, is filled between the respective air-cored coils, and the air-cored coils are not in direct contact with one another. Accordingly, insulating properties among the air-cored coils are ensured.

Figure 4:
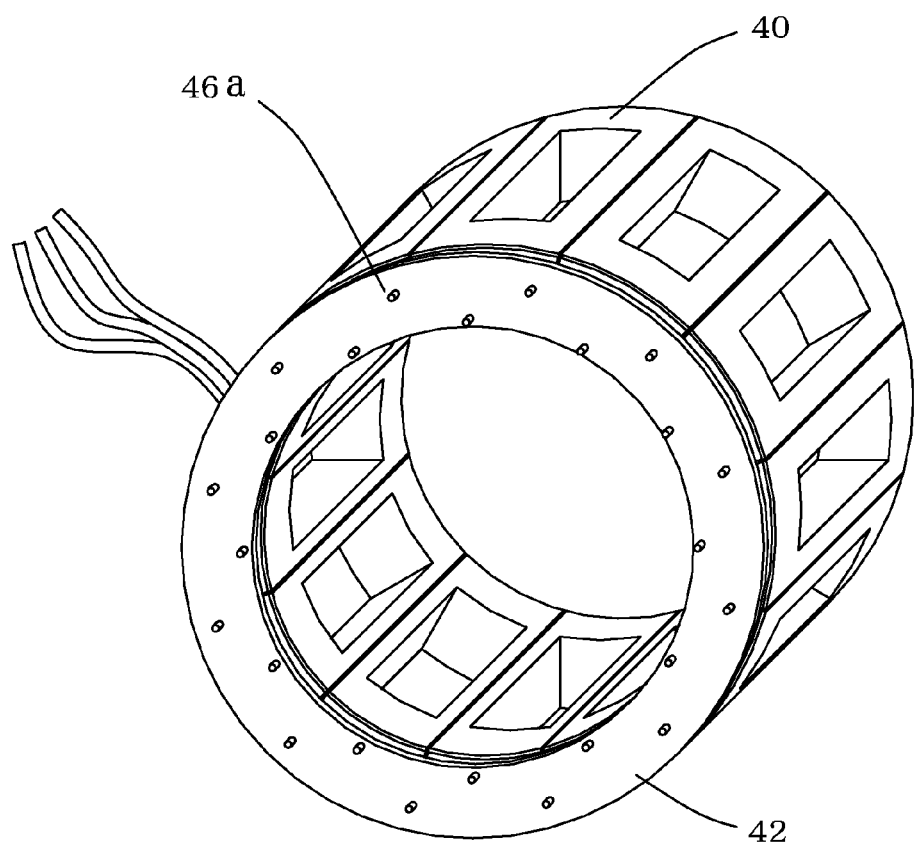
FIG. 4 is an outer appearance view of the stator coils having a connection unit mounted thereon.

FIG. 4 is an outer appearance view of the stator coils having the connection unit mounted thereon.

In FIG. 4, on the conductor ends 46a of the respective air-cored coils which form the stator coils 40, a connection board in which attachment holes are provided in advance is mounted, and the connection unit 42 is thereby provided.

Figure 5:
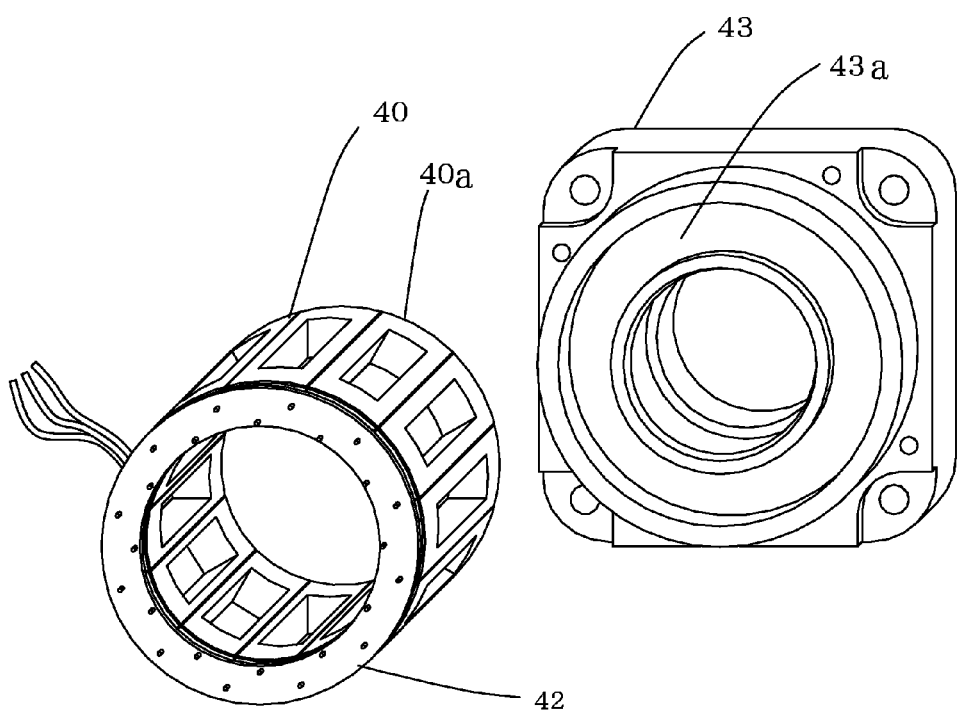
FIG. 5 is an explanatory view of mounting the stator coils on a load-side bracket.

FIG. 5 is an explanatory view of mounting the stator coils on the load-side bracket.

In FIG. 5, the stator coils 40 are mounted on the load-side bracket 43 without interposing the stator cores therebetween. Accordingly, end surfaces of the load-side coil ends 40a can be securely brought into close contact with the bracket.

The load-side coil ends 40a of the stator coils are brought into close contact with a recessed portion 43a of the load-side bracket by applying an adhesion promoter thereto. With respect to the heat conduction between the stator coils 40 and the load-side bracket 43, the adhesion promoter reduces contact resistance therebetween, and enhances cooling performance for the stator coils.

Figure 6:
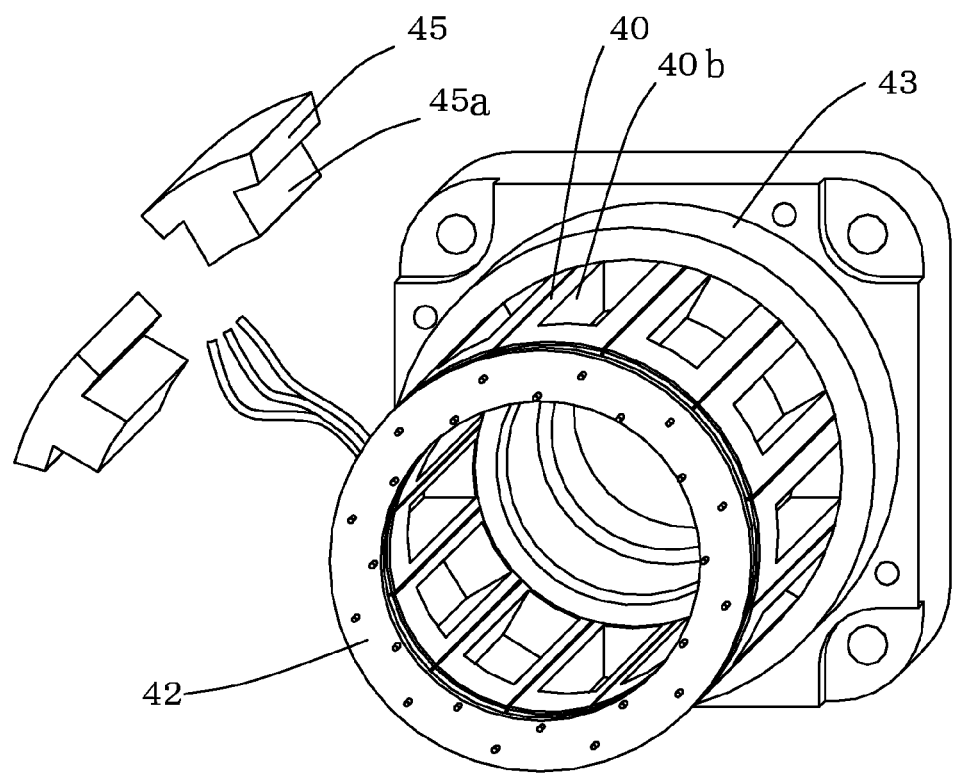
FIG. 6 is an explanatory view of mounting stator cores.

FIG. 6 is an explanatory view of mounting the stator cores.

In FIG. 6, on the stator coils 40, there are gaps 40b of the stator coils on which the teeth portions 45a of the stator cores are mounted. The stator cores 45 divided for each of the teeth are mounted on the gaps 40b from the outside.

Figure 7:
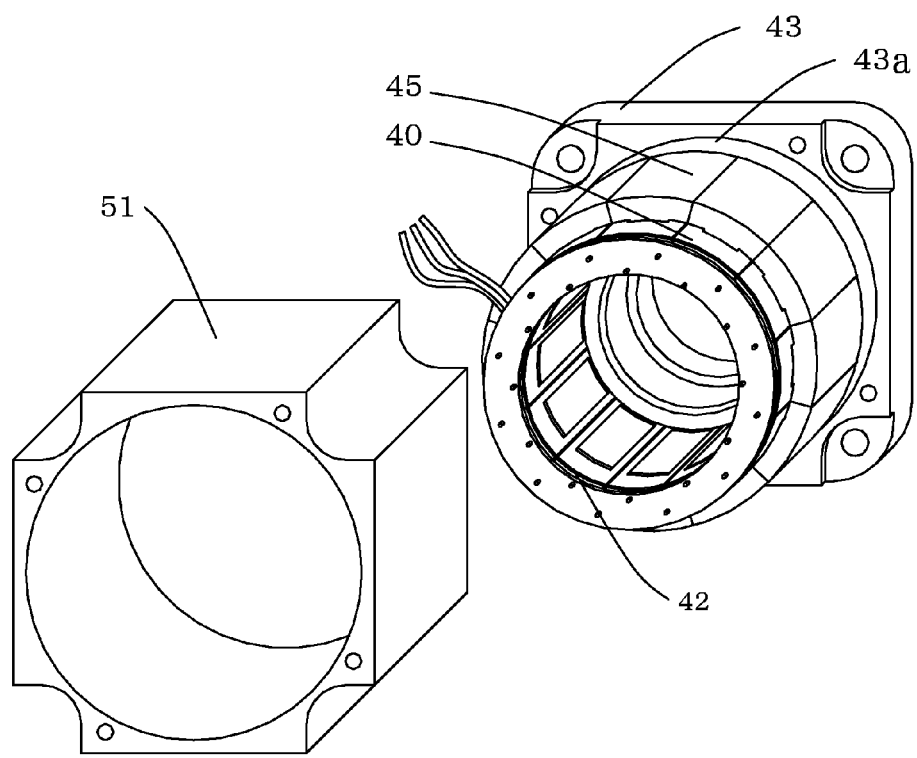
FIG. 7 is an explanatory view of mounting a frame.

FIG. 7 is an explanatory view of mounting the frame.

In FIG. 7, in a state where the stator cores 45 are mounted on the bracket, the frame 51 is mounted on a fitting portion 43b of the load-side bracket, and is fastened thereto together with the anti-load-side bracket by the bolts.

Figure 8:
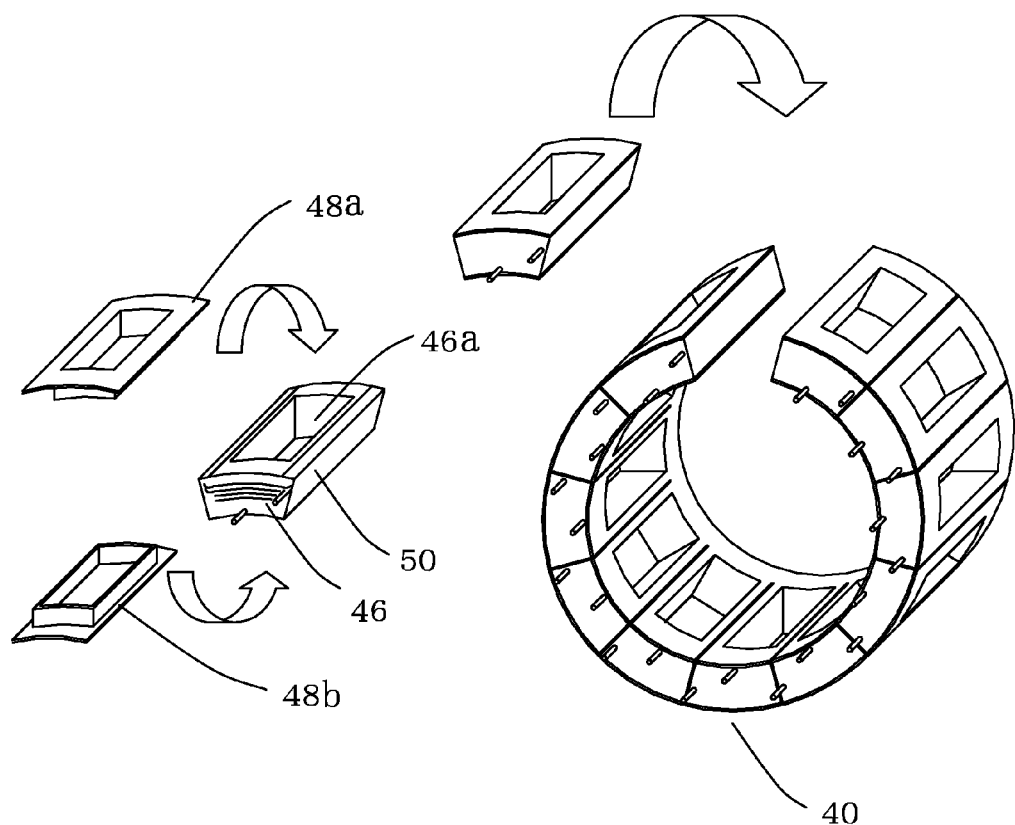
FIG. 8 is an explanatory view of a structure of each of the stator coils.

FIG. 8 is an explanatory view of a structure of each of the stator coils.

In FIG. 8, each of the air-cored coils 46 which form the stator coils 40 may be mounted on a molding die while ensuring a gap of the air-cored coil, and maybe molded integrally therewith by the molding resin. Moreover, in the case where an insulating withstand voltage is further required, an insulating tape 50 or the like may be added as an insulator between the air-cored coils. Moreover, as insulators from the frame and the stator cores, an outer insulator 48a and an inner insulator 48b may be mounted on a gap 46a of each of the air-cored coils, and may be molded integrally therewith by the molding resin.

Figure 9:
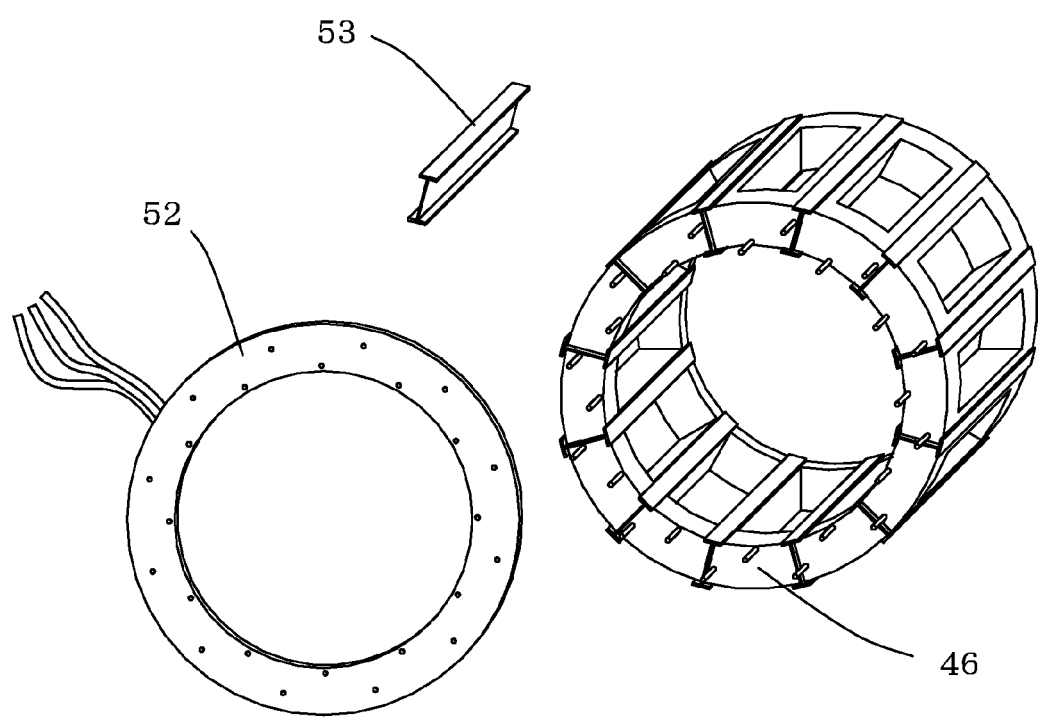
FIG. 9 is an explanatory view of a structure of other stator coils.

Moreover, as in an explanatory view of a structure of other stator coils, which is shown in FIG. 9, in the case where high insulating reliability is particularly required among phases of the stator coils, insulators 53 obtained by molding polyester and the like are installed as interphase insulators among the air-cored coils 46, and are molded integrally therewith by the molding resin, whereby a withstand voltage and reliability, which respond to such a request, can be established.

Figure 10:
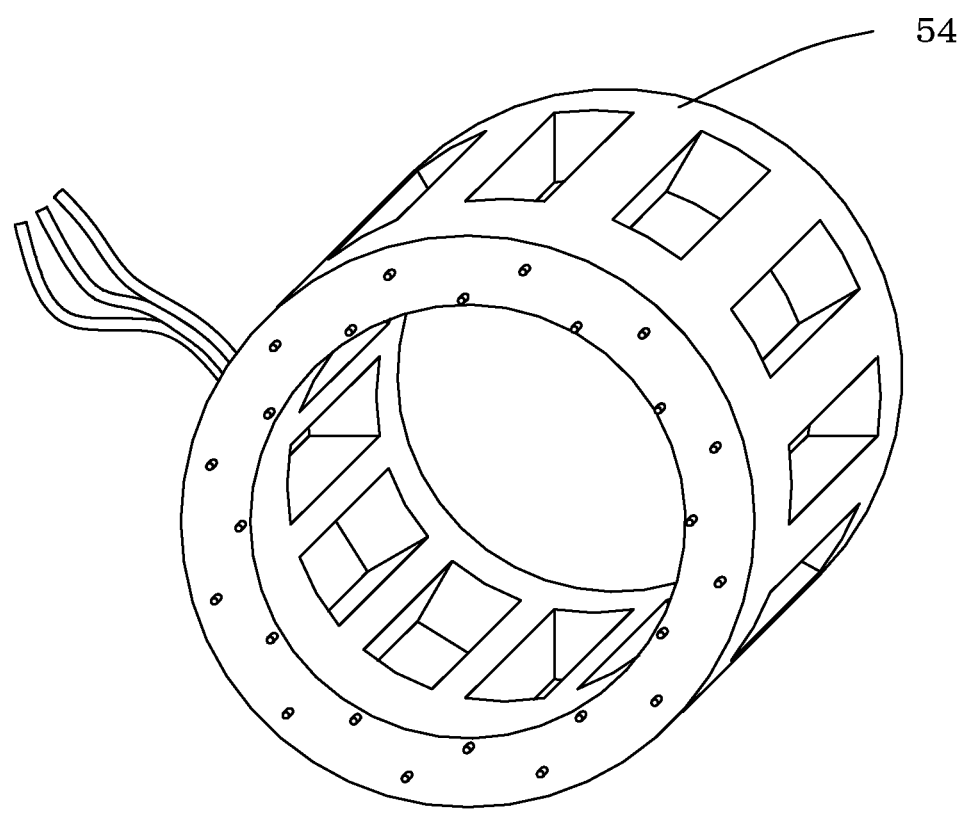
FIG. 10 is an outer appearance view of other stator coils.

Furthermore, the connection board 42 may be mounted in advance on the stator coils and maybe molded integrally therewith by the molding resin. In such a way, as in an outer appearance view of other stator coils, which is shown in FIG. 10, the number of components which form the motor is further reduced, and assembly work thereof becomes easier.

Figure 11:
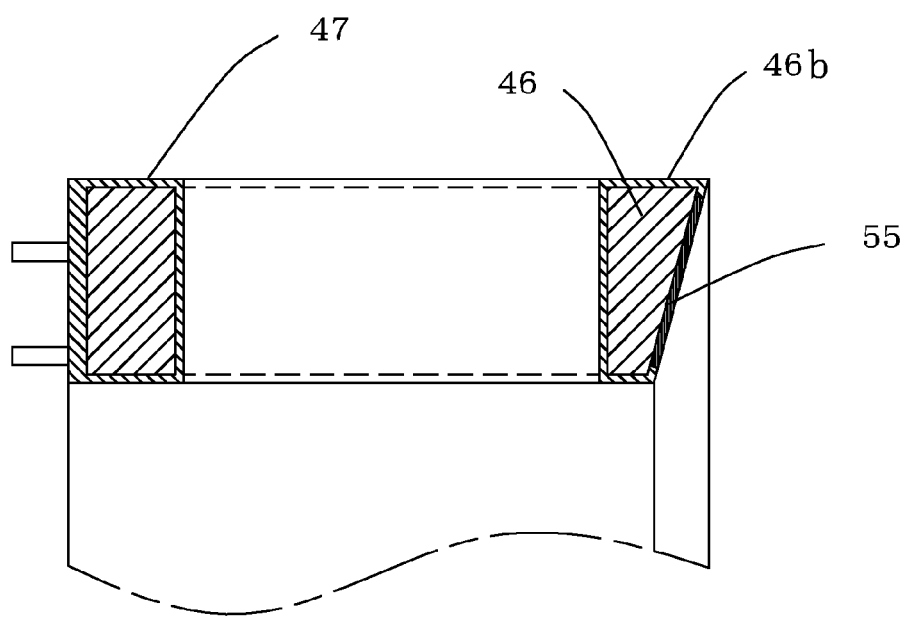
FIG. 11 is an explanatory view of a structure of other stator coils.

Moreover, as in an explanatory view of a structure of other stator coils, which is shown in FIG. 11, a highly heat conductive ceramic plate 55 as an insulator, which is made of aluminum nitride, alumina, or the like, may be brought into close contact with an end surface of each of the air-cored coils 46, and may be molded integrally therewith by the molding resin 47. In accordance with this method, heat radiation performance from the air-cored coils 46 to the load-side bracket can be remarkably enhanced. A large effect is also brought by providing a similar high heat conductor on an outer cylinder 46b of each of the air-cored coils.

Figure 12:
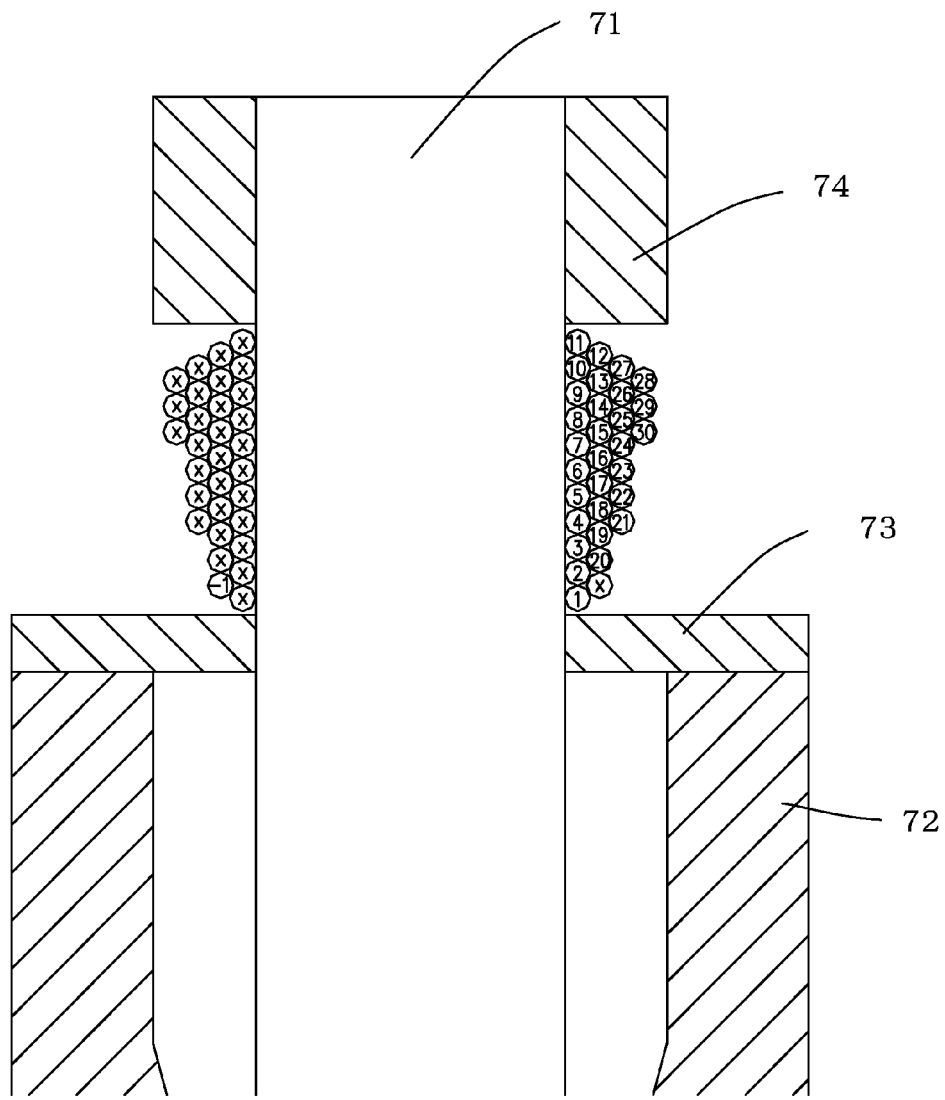
FIG. 12 is an explanatory view of a winding structure of an air-cored coil.

FIG. 12 is an explanatory view of a winding structure of the air-cored coil, showing a winding order and position of a round copper wire having an insulating film, the round copper wire being a raw material of the air-cored coil. The air-cored coil of this embodiment is fabricated in such a manner that a round copper wire 75 as a bonding wire is wound around a jig, and that an outer shape thereof is subjected to pressure molding, and is heated and fused.

First, the round copper wire 75 is wound in order shown in FIG. 12. FIG. 12 shows a winding order and position of the round copper wire in the case where a radial cross section thereof is viewed from the anti-load side when the round copper wire is mounted on the rotary electric machine. Positive numbers shown on the round copper wire indicate an order in which the round copper wire wound on the load side comes out from the right side, and negative numbers shown on the round copper wire indicate an order in which the round copper wire wound on the load side comes out from the left side.

A winding spacer B73 and a winding spacer U74 are fixed to a core pin 71 and a die 72, which are jigs for use in the pressure molding, respectively, while providing a predetermined interval therebetween. Then, as shown in FIG. 12, the round copper wire is wound so that a winding number of an outer layer thereof can be smaller than a winding number of an inner layer thereof by one turn or more. A range other than an anti-load-side coil end is wound in a complete alignment winding manner, and intersecting of the round copper wire is performed entirely on the anti-load-side coil end. The conductor end of the air-cored coil is provided on the anti-load-side coil end. In such a way, the coil can be wound rapidly in an alignment winding manner.

Next, the air-cored coil is subjected to the pressure molding.

Figure 13:
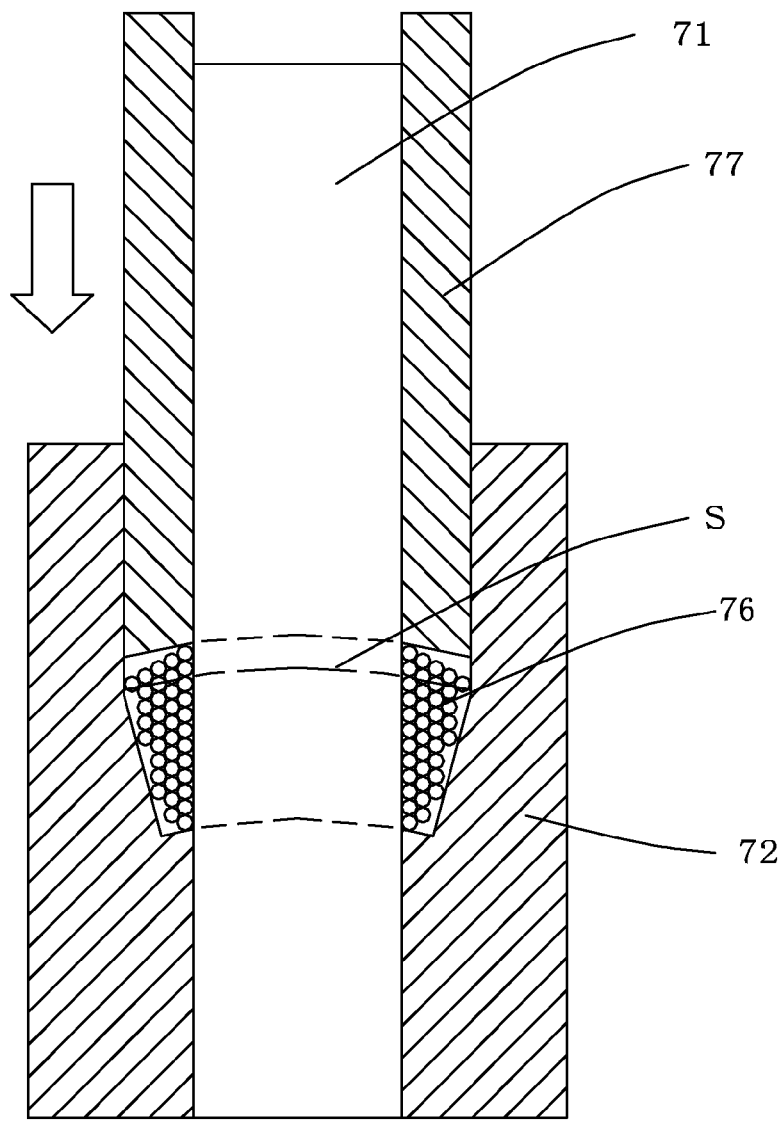
FIG. 13 is an explanatory view of pressure molding for the air-cored coil.

FIG. 13 is an explanatory view of the pressure molding for the air-cored coil. The winding spacer B and the winding spacer U, which are used for winding the round copper wire, are removed, a punch 77 is mounted, and such an unmolded air-cored coil 76 is lowered until reaching an outline S of the already-molded air-cored coil, and thereafter subjected to pressure molding. Except for a coil-end side surface on which the conductor end of the air-cored coil is provided, the outer shape thereof is entirely subjected to the pressure molding. Therefore, the air-cored coil subjected to the pressure molding has an accurate dimension of the outer shape.

Figure 14:
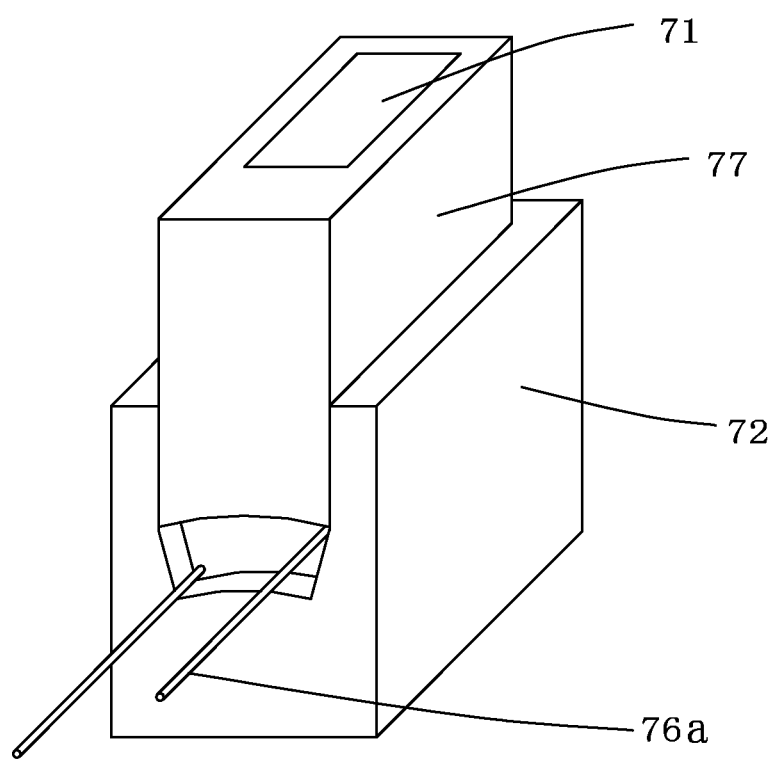
FIG. 14 is an explanatory view of heat fusing for the air-cored coil.

Next, the air-cored coil is subjected to heat fusing. FIG. 14 is an explanatory view of heat fusing for the air-cored coil.

As shown in FIG. 14, the air-cored coil is fabricated in such a manner that a fusing film of the bonding wire is heated and fused while keeping a state where the outer shape thereof is subjected to the pressure molding by the punch 77. As a heating method for the air-cored coil, the air-cored coil is energized from the conductor end 76a thereof, whereby the air-cored coil is allowed to generate heat.

The bonding wire is not used, but a thermosetting adhesive may be added to the air-cored coil, followed by heating, whereby the air-cored coil is molded.

As described above, the rotary electric machine according to this embodiment includes the stator coils integrally molded by the molding resin, whereby a process time thereof can be shortened. Moreover, the stator cores are assembled in a subsequent step, whereby it is also possible to enhance ease of recycling.

<Second Embodiment>

Figure 15:
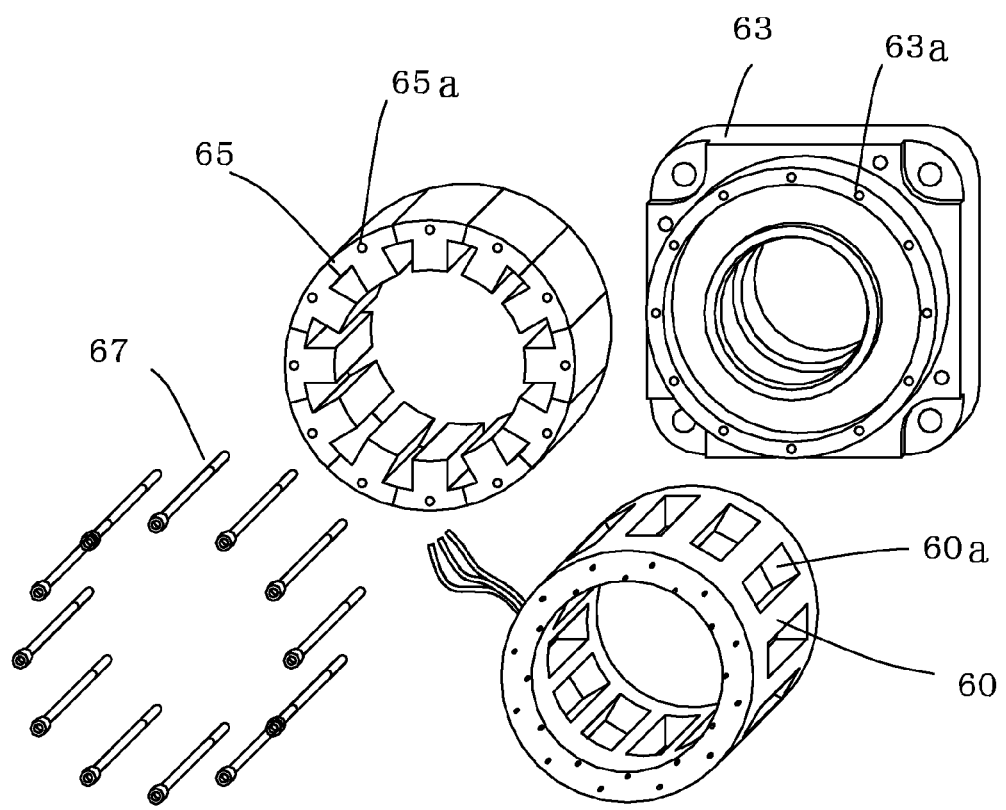
FIG. 15 is an explanatory view of a component configuration of a rotary electric machine according to a second embodiment.

Next, with reference to FIG. 15, a description will be made of a rotary electric machine according to a second embodiment. FIG. 15 is an explanatory view of a component configuration of the rotary electric machine according to the second embodiment of the present invention.

The rotary electric machine according to the second embodiment is different from the rotary electric machine according to the first embodiment in a shape of the stator cores, and is similar thereto in other configurations. Hence, in the following, a repeated description is omitted as appropriate, and a description is mainly made of points different from the first embodiment.

In twelve stator cores 65 divided for each of teeth, bolt fastening holes 65a are provided. In a load-side bracket 63, stator coil-fastening tap holes 63a are provided. The stator cores 65 mounted on gaps 60a of stator coils from an outside are directly mounted on the bracket individually by bolts. In such a way, though the number of components is increased, it becomes particularly possible to separate the stator cores as iron members and the stator coils as copper members from each other only by pulling off the bolts in the case where such materials of the rotary electric machine that has been discarded and unnecessary are disassembled and collected as resources. In such a way, ease of recycling in the event of the disassembly and the collection can be enhanced.

Figure 16:
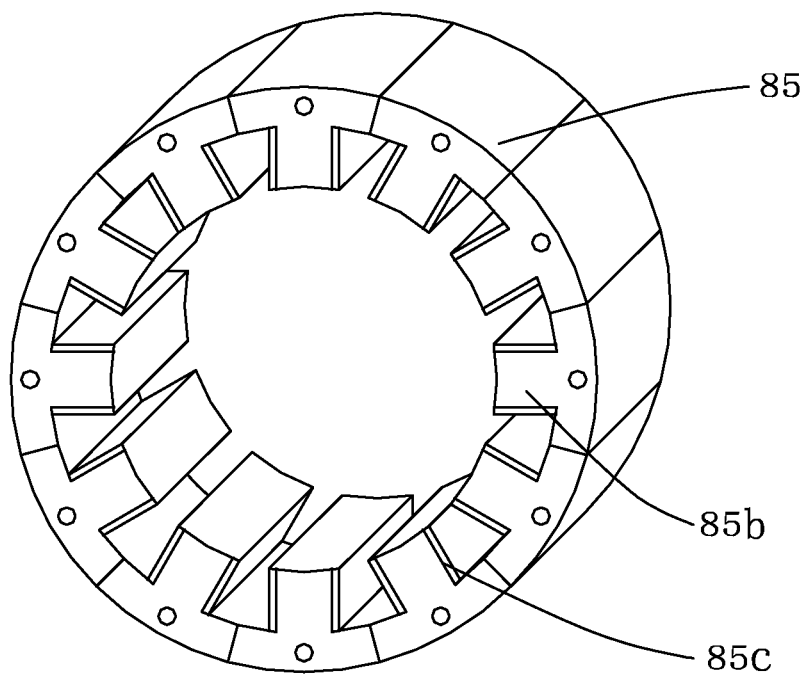
FIG. 16 is an explanatory view of a shape of stator cores.

FIG. 16 is an explanatory view of the shape of the stator cores.

In FIG. 16, chamfered portions 85c are provided on corners of each of teeth portions 85b of the stator cores. The chamfered portions 85c are formed into a shape matched with a size of an inner radius of such four corners, whereby a circumferential length of the coil can be shortened, and winding resistance can be reduced.

Figure 17A:
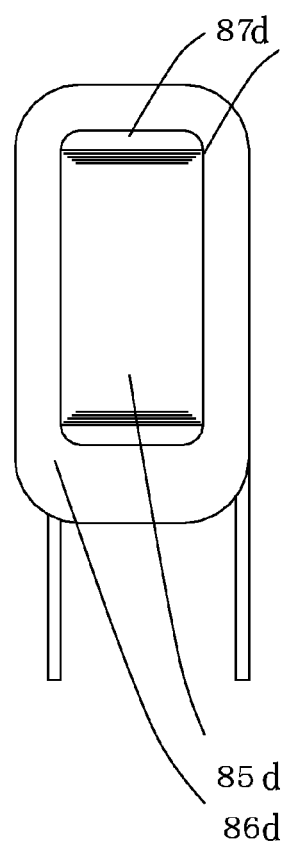
FIGS. 17A, 17B, and 17C are explanatory views of chamfered shapes of the stator cores.
Figure 17B:
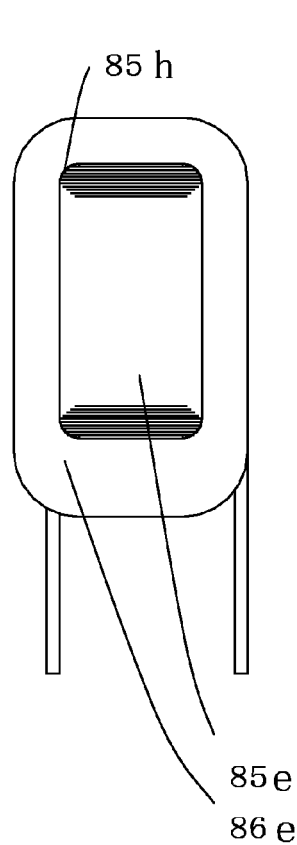
Figure 17C:
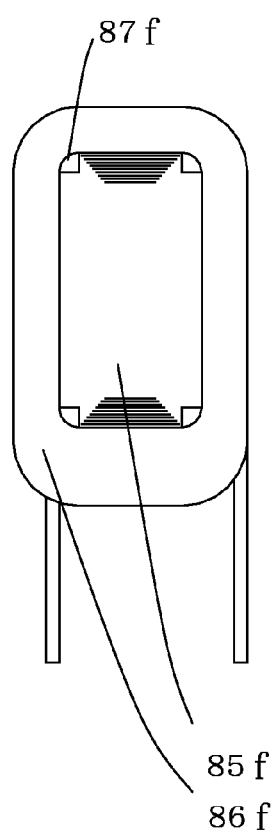

FIGS. 17A to 17C are explanatory views of chamfered shapes of the stator cores, showing three types of cross sections of air-cored coils and teeth portions of stator cores, which are fitted to gaps of the air-cored coils.

In FIGS. 17A to 17C, as shown in FIG. 17A, in the case of a stator core 85d in which a corner 85g of each of the teeth of the stator core is not chamfered, an air-cored coil 86d requires a gap 87d corresponding to an amount of the inner radius of the corners thereof, and the air-cored coil becomes axially long.

In the case of FIG. 17B showing the chamfered shape of each of the stator cores of the rotary electric machine according to the second embodiment, a teeth width of steel plates which form the stator core is changed one by one, and a stator core 85e is formed, which has a chamfered portion 85h of the teeth corner, the chamfered portion 85h being approximated to a shape of a bending radius of a corner of an air-cored coil 86e. Therefore, the gap corresponding to the amount of the inner radius of the corners becomes unnecessary, and the air-cored coil 86e can shorten an axial length thereof.

As shown in FIG. 17C, a stator core 85f may be adopted, in which the teeth width of the steel plates which form the stator core is not changed one by one, but a necessary number of steel plates with a smaller teeth width are used on the end. In this case, although a gap 87f corresponding to the amount of the bending radius of the corner is generated, an axial length of an air-cored coil 86f can be shortened while minimally suppressing the number of components of the stator cores.

The air-cored coils in which the axial length is shortened are used for the stator coils, whereby not only the rotary electric machine can be further miniaturized, but also the round copper wire as the raw material can be saved. Furthermore, since the winding length of each of the air-cored coils is shortened, the winding resistance is reduced, and the heat generation itself in the stator coils for which the cooling performance is required can be reduced.

As described above, the rotary electric machine according to this embodiment includes the stator cores different in shape from those of the first embodiment. Therefore, in addition to the functions and the effects, which are exerted by the rotary electric machine according to the first embodiment, the ease of recycling in the event of the disassembly and the collection can be enhanced, and the cooling performance for the stator coils can be enhanced. This contributes to resource saving and an increase of the rated output of the rotary electric machine.

In accordance with an aspect of the embodiment, a stator coil is not molded by the molding resin on a main line of a manufacturing process, but the stator coils integrally molded in advance in a sub-line are prepared as one component. Accordingly, in the main line, the rotary electric machine is completed only by assembly, and the process time can be reduced to a large extent. Moreover, the rotary electric machine that has been discarded and unnecessary can be easily disassembled only by detaching the fastening bolts, and in particular, it is easy to separate the iron members and the copper members from each other, and the ease of recycling can be remarkably enhanced.

The description has been made above of the respective embodiments of the present invention; however, the invention of this application is not limited to the above-described embodiments, and can be arbitrary and suitably changed within the scope thereof.

The rotary electric machine of the present invention can be applied not only as an industrial servo motor but also as a wide range of rotary electric machines including a motor such as a home appliance motor and an elevator motor, and an aerogenerator, an engine generator, and a microturbine generator.

Further effects and modification examples can be easily derived by those skilled in the art. Embodiments of the present invention are not limited to the specific embodiments as described above. Hence, a variety of alterations are pos-

What is claimed as new and is desired to be secured by Letters Patent of the United States is:

1. A rotary electric machine comprising:
    a substantially cylindrical rotator that is freely rotatably supported;
    a stator; and
    brackets which support the rotator and the stator, wherein the stator includes:
    stator coils in which a plurality of air-cored coils are arranged in a ring shape and are integrated by resin, each of the air-cored coils being formed by winding a round copper wire and having an outer shape subjected to pressure molding; and
    stator cores divided for each of teeth.

2. The rotary electric machine according to claim 1, wherein, in each of the stator coils, either of an outer cylinder and a coil-end side surface that does not have a conductor end of the air-cored coil provided thereon is mounted to be brought into close contact with the brackets.

3. The rotary electric machine according to claim 1, wherein, in each of the stator coils, an outside excluding a coil end having a conductor end of the air-cored coil provided thereon is coated with either of resin and an insulating material contained in each of the integrated air-cored coils, and each of the air-cored coils is not in contact with a surface of the stator coil.

4. The rotary electric machine according to claim 1, wherein, in each of the stator coils, either of resin and an insulating material contained in each of the integrated air-cored coils is filled among the respective air-cored coils, and the air-cored coils are not in direct contact with one another.

5. The rotary electric machine according to claim 1, wherein, in each of the stator coils, an insulating material having higher heat conductivity than the resin for use in the integral molding of the air-cored coils is integrally contained in either of an outer cylinder and a coil-end side surface that does not have a conductor end of the air-cored coil provided thereon.

6. The rotary electric machine according to claim 3, wherein the insulating material is a sheet-like member made of either of aluminum nitride and alumina.

7. The rotary electric machine according to claim 1, wherein the stator coils have a connection unit for the respective air-cored coils.

8. The rotary electric machine according to claim 1, wherein each of the stator coils is mounted on the load-side bracket without interposing the stator core therebetween.

9. The rotary electric machine according to claim 1, wherein each of the stator coils is integrated with a frame together with the stator core, and is fastened to the brackets.

10. The rotary electric machine according to claim 1, wherein
    each of the air-cored coils is formed by winding a round copper wire having an insulating film, a slot of each of the stator cores and a coil end brought into close contact with the brackets are wound in a complete alignment winding manner, intersecting of the round copper wire is performed entirely on an anti-load-side coil end, and an end of each of the stator coils is provided on the anti-load-side coil end.

11. The rotary electric machine according to claim 1, wherein, in each of the air-cored coils, a winding number of an outer layer can be smaller than a winding number of an inner layer by one turn or more.

12. A method for manufacturing the air-cored coils according to claim 1,
    wherein each of the air-cored coils is manufactured in such a manner that a bonding wire is wound around a jig, and that an outer shape thereof is subjected to pressure molding, and is heated and fused.

13. A method for manufacturing the air-cored coils according to claim 1, wherein
    in a method for heating each of the air-cored coils, the air-cored coils, each having the outer shape subjected to the pressure molding, are energized and allowed to generate heat.

14. A method for manufacturing the air-cored coils according to claim 1,
    wherein each of the air-cored coils is molded in such a manner that the round copper wire is wound around a jig, that an outer shape thereof is subjected to the pressure molding, and that a thermosetting adhesive is added thereto, followed by heating.

15. The rotary electric machine according to claim 1, wherein a corner of teeth in each of the stator cores is chamfered to two stages or more.

* * * * *